A. RUSSELL & F. CURTIS. 3 Sheets—Sheet 1.

SHIP'S PUMP.

No. 10,418. Reissued Dec. 4, 1883.

*Attest:*
Wm. H. Drury.
Fred J. Hutchinson.

*Inventors:*
Albert Russell,
Francis Curtis,
per Edw. Dumner, Atty.

N. PETERS, Photo-Lithographer, Washington, D. C.

A. RUSSELL & F. CURTIS. 3 Sheets—Sheet 2.

SHIP'S PUMP.

No. 10,418. Reissued Dec. 4, 1883.

*Attest:*
Wm. H. Drury.
Fred J. Hutchinson.

*Inventors:*
Albert Russell,
Francis Curtis,
per Edw. Dummer, Atty.

N. PETERS. Photo-Lithographer, Washington, D. C.

A. RUSSELL & F. CURTIS. 3 Sheets—Sheet 3.

SHIP'S PUMP.

No. 10,418. Reissued Dec. 4, 1883.

*Attest:*
Wm. H. Drury,
Fred J. Hutchinson.

*Inventors:*
Albert Russell,
Francis Curtis,
per Edw. Dumner, Atty.

N. PETERS, Photo-Lithographer, Washington, D. C.

UNITED STATES PATENT OFFICE.

ALBERT RUSSELL AND FRANCIS CURTIS, OF NEWBURYPORT, MASS.

SHIP'S PUMP.

SPECIFICATION forming part of Reissued Letters Patent No. 10,418, dated December 4, 1883.

Original No. 274,145, dated March 20, 1883. Application for reissue filed May 18, 1883.

*To all whom it may concern:*

Be it known that we, ALBERT RUSSELL and FRANCIS CURTIS, citizens of the United States, residing at Newburyport, in the county of Essex and State of Massachusetts, have invented certain new and useful Improvements in Ships' Pumps, of which the following is a specification, reference being had to the accompanying drawings.

Our invention relates to pumps especially adapted for use in ships, but also suitable for other and various situations; and it consists in certain improvements in the construction of such pumps, which improvements are hereinafter fully described, and specifically pointed out in the claims.

It is the object of our invention to so construct and arrange the several parts of the pump as to secure great economy in its manufacture with regard to both labor and material, and to produce a pump of great practical efficiency and durability, and one operated easily and to good advantage, and readily kept in working condition. It is a part of said object to produce a piston or bucket pump which is of good capacity, yet quite short, which is attained by making the barrel of large diameter in proportion to its length. This is a very desirable feature of the invention, since such a pump may be lined most successfully, as hereinafter set forth, and is particularly suitable for ships, where it is important that as much of the pump as possible be above deck, that it may be conveniently set and taken care of, and yet not of great height for convenience in operation and keeping in order, and to be out of the way as much as may be, and so that it will not be exposed to injury.

Figure 1:
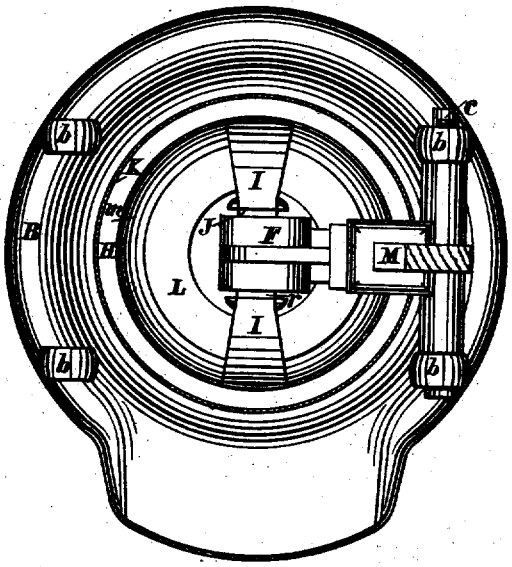
Figure 2:
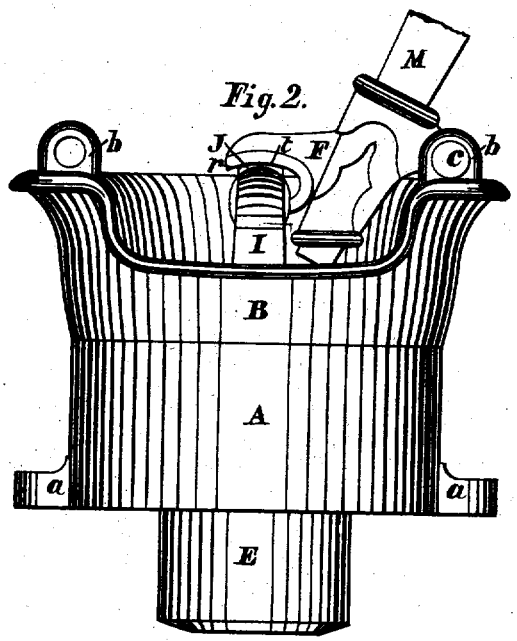
Figure 3:
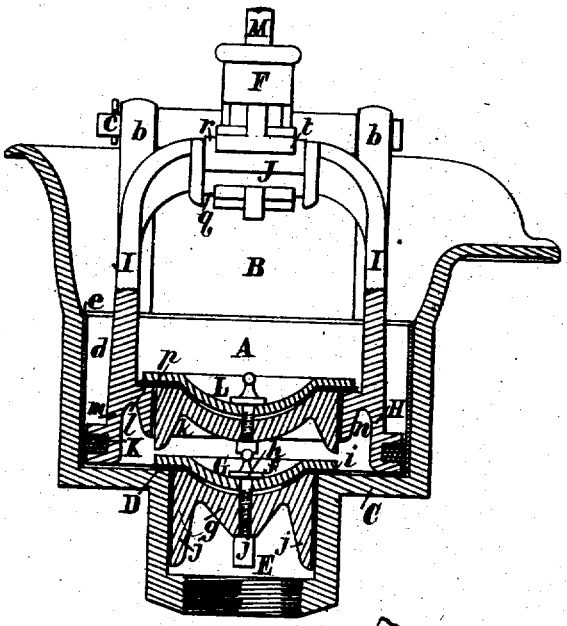
Figure 4:
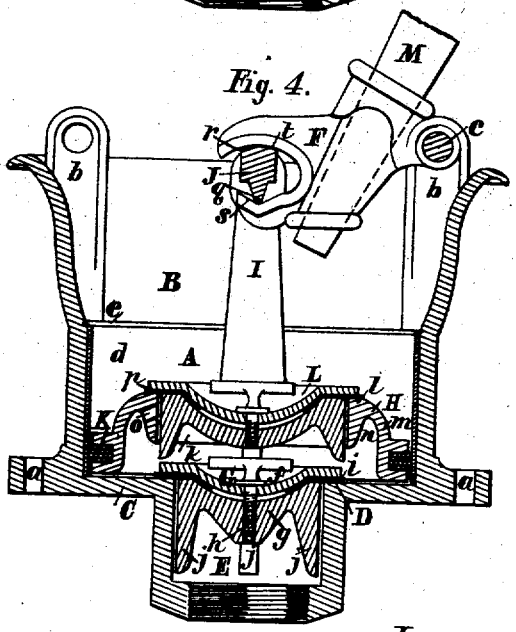
Figure 5:
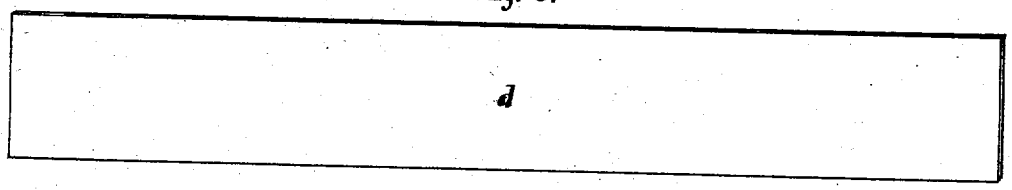
Figure 6:
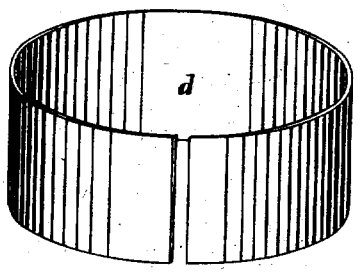
Figure 7:
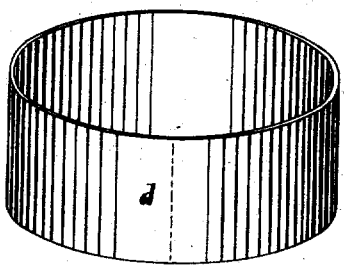
Figure 8:
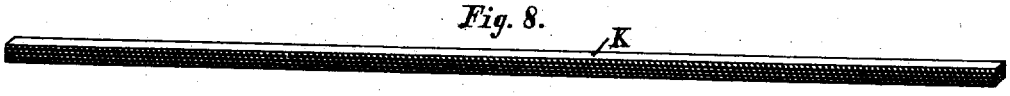
Figure 9:
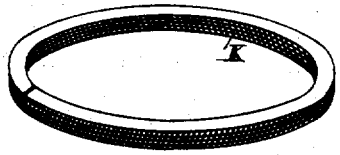

In the drawings, three sheets, Figure 1 is a plan view of a pump embodying our invention, and Fig. 2 is a front elevation. Figs. 3 and 4 are central vertical sections taken at right angles to each other, Fig. 3 showing the upper part of the bucket-bail and the half-beam in full. Fig. 5 shows a perspective view of the lining after having been cut from the sheet, Fig. 6 after having been bent around for insertion into the barrel, and Fig. 7 as it is after having been rolled into place in the barrel. Fig. 8 is a perspective view of the packing K before it is bent around, and Fig. 9 as it is in the groove of the bucket.

The barrel A, bowl B, base C, lower valve-seat, D, and tubular extension E are all cast in one piece, having also cast or formed therewith the lugs *a a*, to receive bolts or screws for fastening the pump in position, and ears *b b b b*, two on each of two opposite sides of the bowl, as shown, for receiving the pivot-pin *c* of the half-beam F. Thus the half-beam and brake may be pivoted and operated at either of these two sides at will. The barrel of the pump is lined with sheet-brass or other suitable sheet material, as follows: The cast barrel is first bored out, and then a piece of the sheet material *d* cut of the right size and shape, and being bent around, is expanded and pressed closely against the inner surface of the barrel by means of rollers or burnishers, there being a shoulder, *e*, in the pump-barrel or not, as deemed best. Thus by this stretching process the lining is firmly secured in the pump, not needing any other fastening, as by soldering or otherwise, either at the ends or edges of the sheet, and it makes a cylindrical and smooth interior surface without any other finish than by means of the expanders. Since this lining cannot easily be worked into a pump that has its bottom or base C cast on and has a barrel of ordinary length, we make the pump short by means of the devices and construction herein specified.

On the seat D is the lower valve, G. This valve is of two pieces, *f* and *g*, held in proper relative position and drawn toward each other by means of a screw, *h*, having as packing an annular disk, *i*, of suitable material, clamped between the pieces *f* and *g* by means of the screw *h*, and extending over the seat D. The central parts of the pieces *f* and *g* are depressed, so as to bring the weight of the valve as low down as possible, that it may be best kept in place by the lugs *j*, cast with the piece *g*, extending into and guided by the tubular extension E, and also to bring the head of the screw *h* down out of the way of the bucket or its valve.

The body H, standards I I, and cross-bar J of the bucket and its bail are cast together as one piece. The body H of the bucket has an inner tubular part, *k*, at the upper portion of which is the valve-seat *l* and the annular part *m*, which, being turned outwardly downward, as shown, gives a dome shape to the bucket. In the outer edge face of the bucket is a square or rectangular groove, in which is the packing K. By thus dropping the outer edge and packing of the bucket as low down as possible with reference to the remainder of the bucket, the barrel of the pump may be made very short, and the bearing of the bucket or packing is in the best position for working evenly. To prevent air from accumulating, and thus displacing water below the bucket and in the annular space *n*, one or more openings, *o*, are made, extending from said space to the central opening of the bucket.

The valve L of the bucket is of construction similar to that of the lower valve, G, and has the packing *p* held therein in a similar manner. The valve G is smaller than the valve L, so that the lower as well as the upper valve may be removed from the pump without removing the bucket. The bucket may be cast with ears, in the usual way, for a pin-joint, and connected to a similar device on the beam by a joint-pin. Such construction has some advantages; but we prefer the construction shown, wherein the upper part or cross-bar J of the bail is of a peculiar form. The lower edge, *q*, is V-shaped, while the upper side, *r*, is of a slightly curved form.

The half-beam F has a V-shaped groove, *s*, in which the V-edge of the bail sets and plays, while the half-beam is formed at *t* to extend over and bear against the upper side, *r*, of the bail. The half-beam is open at the outer end, or may be open at the upper and inner part, whereby the half-beam may be in the form of a hook, so that when the pivot-pin *e*, which extends through the ears *b* and the half-beam, is removed the half-beam may be readily hooked on or unhooked from the bucket-bail. The V-shaped edge of bail and V-shaped grooved in half-beam, corresponding to the parts forming similar bearings in steel-yards, form an important feature in our pump, since thus it may be operated with the least friction at this point, and the bearing parts are easily constructed, being cast in chills and requiring no further finish. The metal of these parts being hardened, they are very durable. The brake M is made tapering at this end, so as to fit the tapering recess in the half-beam F, and thus be easily inserted in or withdrawn from the half-beam.

The packing K is made of a strip of suitable material, preferably sheets of cloth cemented with rubber, rectangular in cross-section, and corresponding to the shape of the groove in the edge-face of the bucket. This strip, having been cut of suitable length, is bent around from a straight piece and pressed in the groove. Thus it makes a close joint, even though partially worn, since it has a constant tendency to spring outward and fit closely against the barrel, the upper and lower sides of the groove, being parallel, allowing such motion of the packing. Such packing is economical in first cost, and may be readily and cheaply renewed.

We do not claim a half-beam separately as a new invention, since the same has before been known and patented to the aforesaid Albert Russell, (Letters Patent No. 105,982, dated August 2, 1870, Reissue No. 5,959, dated July 7, 1874;) but

We claim as our invention—

1. In a pump, the combination of a bucket and half-beam for joint operation, as specified, the bail of the bucket having a V-shaped edge to bear in a V-shaped groove in the half-beam, substantially as and for the purpose set forth.

2. The combination of the bucket the bail of which has a V-shaped edge, *q*, and a curved surface at *r*, with the half-beam having a V-shaped groove, *s*, and formed at *t* to extend over and bear against the upper side of the bucket-bail, substantially as specified.

3. A pump-bucket having a bail which is cast on the body of the bucket as one piece therewith, said bail having cast therewith one of the two parts forming the articulation or joint at the juncture of the bail with the beam or half-beam, in combination with a beam or half-beam having formed as one piece therewith the other of said two parts, so that said joint may be complete without the intervention of another or third piece, substantially as set forth.

4. In a pump, a bucket having a bail cast in one piece with the body of the bucket, the upper part or cross-bar of the bail having a V-shaped edge, which is hardened or chilled in the casting, substantially as specified.

5. In a pump, a bucket externally dome-shaped—that is, having the exterior or upper surface of the annular part *m* turned down outwardly, so as to bring the outer edge-face and packing at or near the bottom of the bucket—substantially as set forth.

6. A pump-bucket having a channel, pocket, or annular space capable of retaining air below the bucket, and one or more openings or ports, *o*, leading from said channel, pocket, or annular space to the central opening or space immediately below the valve, substantially as described.

7. A pump-bucket, dome-shaped—that is, having an annular part, *m*, turned down outwardly, as specified—and having a rectangular groove in its edge-face, in combination with a flexible packing-piece of cloth cemented with rubber or of material having a like elasticity, rectangular in cross-section, and adapted to fit said groove and extend from the upper to the lower surfaces thereof, and be parallel thereto, substantially as and for the purpose set forth.

8. A lift or ship's pump having a base or inwardly-extending flange, C, cast as one piece with the barrel, and a lining formed of a single flat sheet bent around and rolled into the barrel of the pump, as specified, the ends of said sheet being simply butted together, said ends or the edges of the sheet or lining not being fastened for security to each other or to the pump by other fastening, as by brazing or soldering.

9. As a new and improved article of manufacture, a pump combining these three elements, namely: a pump-body whose bore is shorter than its diameter, for the purpose of most successfully lining it, as specified, a bucket adapted to slide in the pump-barrel, and having its bail cast as one piece with the body of the bucket, as set forth, and a socket-lever or half-beam, substantially as described.

10. A piston or bucket pump having a base or inwardly-extending flange, C, cast therewith, and having a barrel whose length is not greater than the diameter thereof, substantially as specified.

11. A piston or bucket pump having a base or inwardly-extending flange, C, cast with the barrel, a barrel whose length is not greater than the diameter thereof, and a lining rolled into the barrel, substantially as specified.

12. In a pump, the combination of a beam or half-beam pivoted to the pump within the circumference thereof, a piston or bucket, and a barrel the length of which is not greater than the diameter, substantially as set forth.

13. In a pump, the combination of a beam or half-beam pivoted to the pump within the circumference thereof, a piston or bucket, a barrel the length of which is not greater than the diameter, and a base or inwardly-extending flange, C, cast with the barrel, substantially as set forth.

14. In a pump, the combination of a beam or half-beam pivoted to the pump within the circumference thereof, a piston or bucket, a barrel provided with a lining, the length of said barrel being not greater than the diameter thereof, the barrel having a base or inwardly-extending flange, C, cast therewith, substantially as described.

ALBERT RUSSELL.
FRANCIS CURTIS.

Witnesses:
JOHN L. KNIGHT,
J. T. BROWN.